United States Patent
Oliphant et al.

(10) Patent No.: US 6,287,069 B1
(45) Date of Patent: Sep. 11, 2001

(54) MOTORCYCLE DOLLY

(76) Inventors: Ward M. Oliphant, 11523 S. 105 E. Ave.; Michael B. Wilson, 11430 S. 87 E. Ave., both of Bixby, OK (US) 74008

(*) Notice: Subject to any disclaimer, the term of this patent is extended or adjusted under 35 U.S.C. 154(b) by 0 days.

(21) Appl. No.: 09/266,101

(22) Filed: Mar. 10, 1999

(51) Int. Cl.$^7$ ........................................ B60P 3/00
(52) U.S. Cl. ............................... 414/426; 414/430
(58) Field of Search ..................... 414/426, 430

(56) References Cited

U.S. PATENT DOCUMENTS

| | | | |
|---|---|---|---|
| 2,610,750 | * 9/1952 | Hulbert | 414/430 |
| 3,625,545 | * 12/1971 | Somers et al. | 280/400 |
| 3,979,137 | * 9/1976 | Lipscomb, Jr. et al. | 280/402 |
| 4,032,167 | * 6/1977 | Chereda | 280/106 T |
| 5,228,712 | * 7/1993 | Speier | 280/401 |
| 5,234,307 | * 8/1993 | Scott | 414/467 |
| 5,462,398 | * 10/1995 | Hymer | 414/462 |
| 5,570,898 | * 11/1996 | Albert | 280/656 |
| 5,609,461 | 3/1997 | Lichtenberg | 414/426 |
| 5,674,044 | * 10/1997 | Ranes | 414/563 |

* cited by examiner

*Primary Examiner*—Steven A. Bratlie
(74) *Attorney, Agent, or Firm*—Frank J. Catalano

(57) ABSTRACT

A motorcycle dolly is provided which includes a carriage for conveying the motorcycle parallel to a first plane and a prop mounted on the carriage for supporting the motorcycle in symmetrical orientation with respect to a second plane perpendicular to the first plane. In normal use, the first plane will be horizontal and the second plane vertical. The carriage consists of a chassis mounted on a plurality of casters. The casters have 360° turn capability and a locking mechanism for preventing rotation of their wheels. A ramp slopes downwardly and away from the rear end of the channel to facilitate driving the motorcycle onto the web of the channel. The prop consists of a channel fixed to the carriage with the web of the channel perpendicular to the first and second planes and the flanges of the channel aligned to receive the front wheel of the motorcycle therebetween. At least one pair of resiliently flexible elongated plates is fixed to the inside walls of each of the flanges proximate one end of the plates. At least one pair of flexing mechanisms is mounted on each of the flanges and engageable with one of the plates. Each flexing mechanism cooperates with its associated flange to vary the distance between the plates and lock the motorcycle in the vertical condition.

20 Claims, 3 Drawing Sheets

MOTORCYCLE DOLLY

BACKGROUND OF THE INVENTION

This invention relates generally to motorcycle accessories and more particularly concerns a dolly usable to support a motorcycle for storage, long distance transport, maintenance and repositioning in tight quarters.

A free-standing motorcycle is generally supported by its kickstand with the motorcycle leaning at a considerable angle from the vertical. As a result, the motorcycle takes up significantly more space than it occupies in a vertical position. If the motorcycle is stored or transported in a limited space environment such as a shed, garage, trailer or flat bed of a pick-up truck, space is at a premium. Furthermore, it is very difficult to maneuver the motorcycle in such confined storage and transport areas. In addition, maintenance of a motorcycle supported by the kickstand can be clumsy and inconvenient because the parts being worked on are angled in relation to the workman.

A motorcycle dolly disclosed in U.S. Pat. No. 5,609,461, issued on Mar. 11, 1997 to Bruce A. Lichtenberg, does increase the maneuverability of a free-standing motorcycle. However, the dolly disclosed in that patent supports the motorcycle in its kickstand position and, therefore, solves none of the difficulties resulting from the angled position of the motorcycle on its kickstand.

It is, therefore, an object of this invention to provide a motorcycle dolly which supports a motorcycle in an upright position without the use of a kickstand. Another object of this invention is to provide a motorcycle dolly which allows a motorcycle to be manipulated over a 360° range of motion. Another object of this invention is to provide a motorcycle dolly onto which a motorcycle can be driven. A further object of this invention is to provide a motorcycle dolly which is capable of supporting motorcycles of varying size. It is also an object of this invention to provide a motorcycle dolly which supports a motorcycle in a position facilitating maintenance of the motorcycle. And it is an object of this invention to provide a motorcycle dolly which enables a motorcycle to be locked in its upright position.

SUMMARY OF THE INVENTION

A motorcycle dolly is provided which includes a carriage for conveying the motorcycle parallel to a first plane and a prop mounted on the carriage for supporting the motorcycle in symmetrical orientation with respect to a second plane perpendicular to the first plane. In normal use, the first plane will be horizontal and the second plane vertical. The carriage consists of a chassis mounted on a plurality of casters. Preferably, the casters have 360° turn capability and a locking mechanism for preventing rotation of their wheels. Preferably, a first pair of casters is symmetrically displaced from the vertical plane on a first axle at the front end of the chassis and a second pair of casters is symmetrically displaced from the vertical plane on a second axle proximate a rear end of the chassis. Most preferably, the second axle is located at approximately a rear quarter point of the chassis. In its preferred embodiment, the chassis is an elongated rigid frame consisting of a channel having a web wider than the width of the widest wheel of the motorcycle, the web being parallel to the first plane. A ramp slopes downwardly and away from the rear end of the channel to facilitate driving the motorcycle onto the web of the channel. The prop consists of a fork having tines spaced to receive the front wheel of the motorcycle therebetween. Preferably, the tines consist of a pair of plates parallel to the second plane. A mechanism is provided for varying the distance between the pair of plates so as to clamp the front wheel of the motorcycle in a vertical condition between the plates. Most preferably, the prop consists of a channel fixed to the carriage with the web of the channel perpendicular to the first and second planes and the flanges of the channel aligned to receive the front wheel of the motorcycle therebetween. At least one pair of resiliently flexible elongated plates is fixed to the inside walls of each of the flanges proximate one end of the plates. At least one pair of flexing mechanisms is mounted on each of the flanges and engageable with one of the plates. Each flexing mechanism cooperates with its associated flange to vary the distance between the other end of the plate and its flange. Two pairs of plates and flexing mechanisms are preferred, one pair of plates extending in a direction parallel to the first plane and the other pair of the plates extending in a direction perpendicular to the first plane. The preferred flexing mechanism consists of a shaft threadedly engaged through its respective flange in the chassis channel or prop channel and having a head at one end thereof butted against its respective plate. The shaft also has a knob at its other end to facilitate manual rotation of the shaft in its threaded engagement.

BRIEF DESCRIPTION OF THE DRAWINGS

Other objects and advantages of the invention will become apparent upon reading the following details description and upon reference to the drawings in which.

Figure 1:
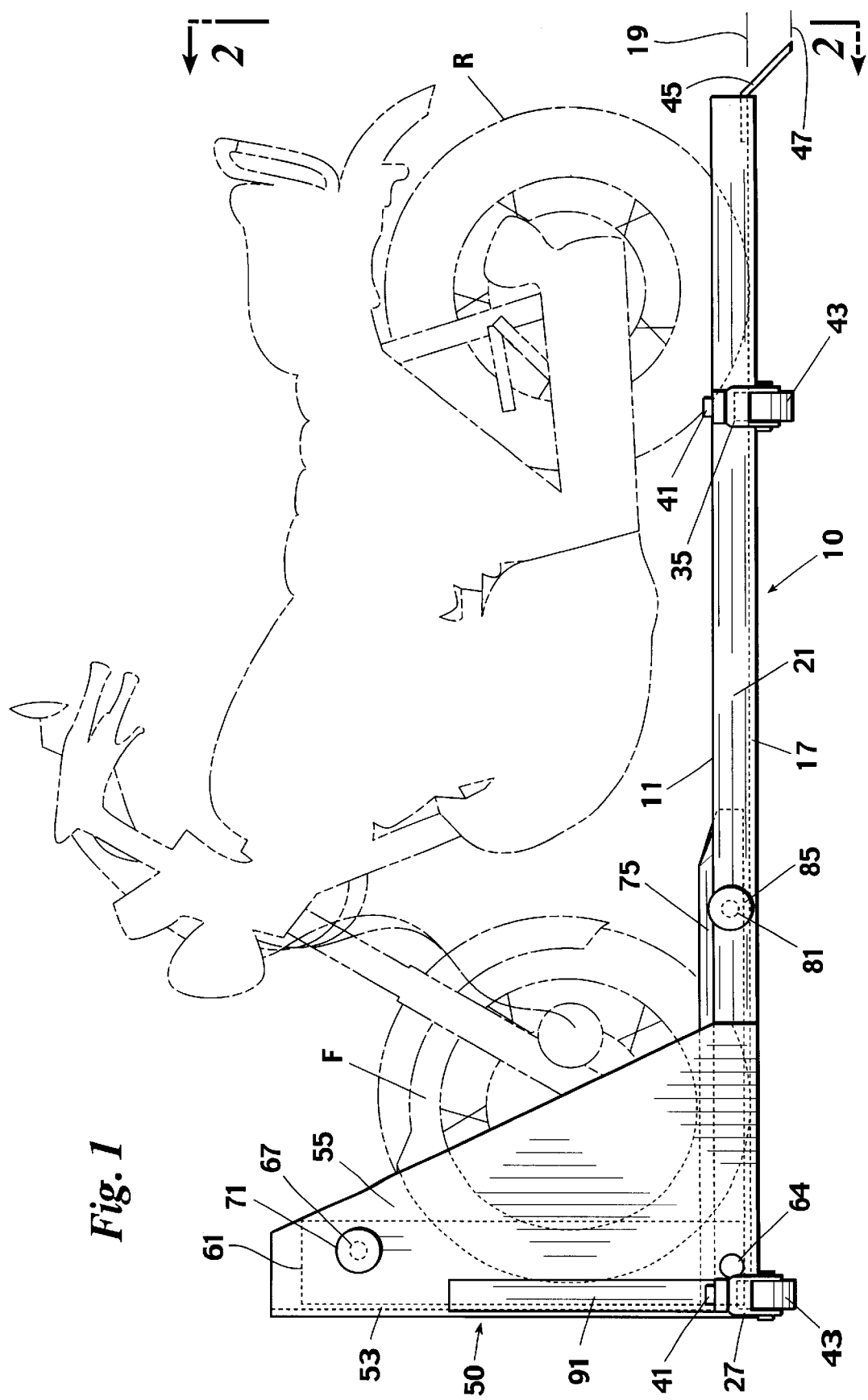
FIG. 1 is a side elevation view of a preferred embodiment of the motorcycle dolly.
Figure 2:
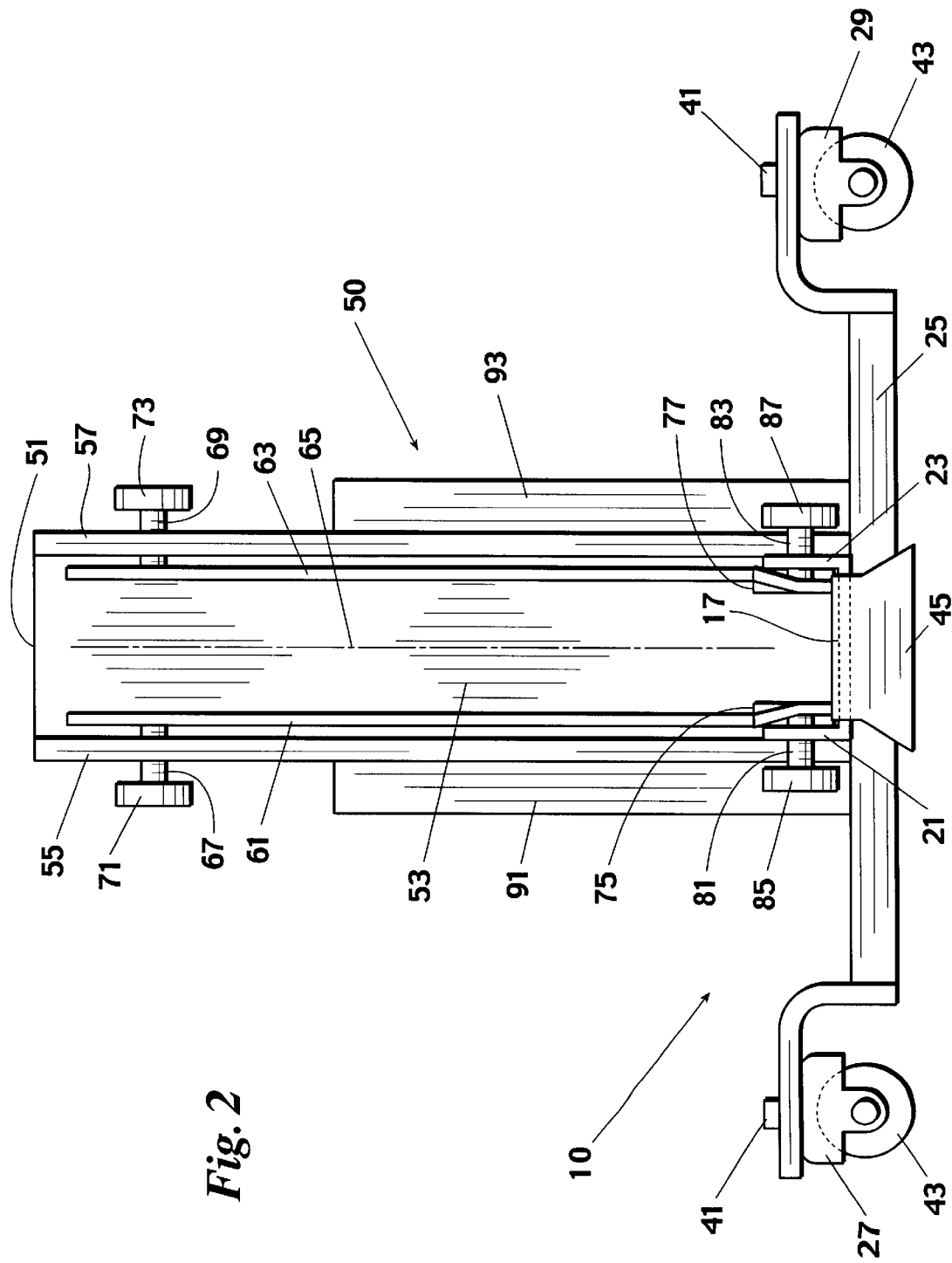
FIG. 2 is an elevation view taken along the line 2—2 of FIG. 1.
Figure 3:
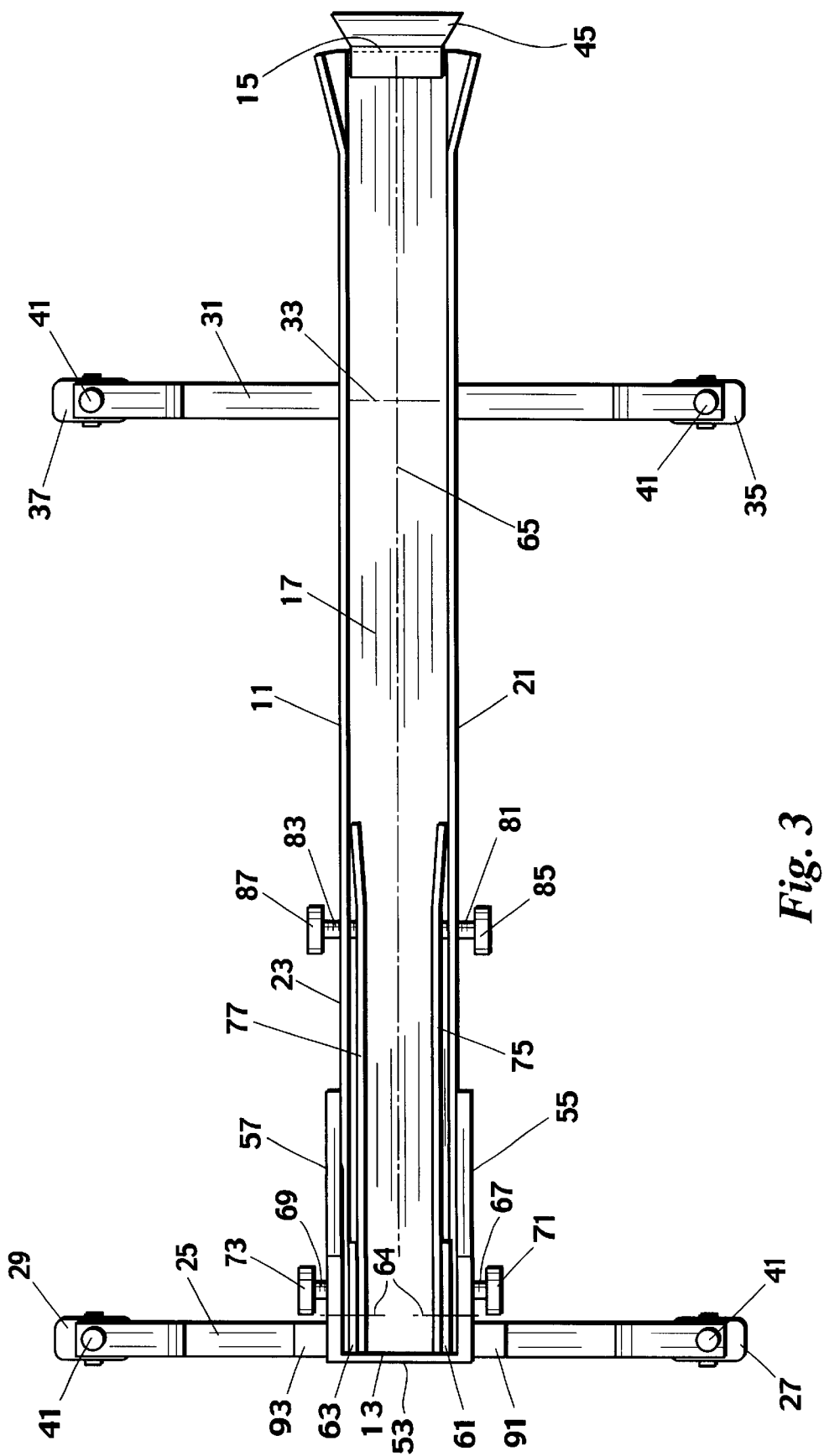
FIG. 3 is a top plan view of the motorcycle dolly of FIG. 1.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION

Turning to the drawings, the preferred embodiment of the motorcycle dolly includes a carriage 10 and a prop 50. The carriage chassis 11 is an elongated rigid frame, preferably a steel channel. The chassis 11 has a front end 13 and a rear end 15. The web 17 of the channel 11 lies in a first plane 19 and its flanges 21 and 23 extend upwardly from the first plane 19. A front axle 25 extends below the front end 13 of the channel 11 to support casters 27 and 29 symmetrically laterally away from the chassis 11. A rear axle 31, preferably located at approximately the rear quarter point 33 of the chassis 11, supports a second pair of casters 35 and 37 laterally symmetrically away from the chassis 11. Each of the casters has a locking mechanism 41 enabling the user to lock the wheels 43 of the casters against rotation. A ramp 45 fastened to the rear end 15 of the chassis 11 extends downwardly and away from the chassis web 17 to a point 47 level with the bottom of the wheels 43.

The prop 50 of the dolly consists of a fork having spaced apart tines extending perpendicularly above the front end 13 of the chassis 11. As shown, the prop 50 includes a second channel 51 having a web 53 which is perpendicular to the first plane 19 and also perpendicular to the flanges 21 and 23 of the first channel 11. The second channel 51 has its flanges 55 and 57 extending from its web 53 toward the rear end 15 of the chassis 11. A vertical fork within the prop channel 51 consists of resiliently flexible elongated plates 61 and 63 which, as shown, are fixed, as by a bolt 64, at their lower ends against the inside walls of the flanges 21 and 23 of the chassis 11. The plates 61 and 63 are parallel to a second plane 65 perpendicular to the first plane 19 and longitudinally bisecting the chassis 11. The upper portions of the plates 61 and 63 can be deflected toward the plane 65 by shafts 67 and 69 which are threaded through the flanges 55 and 57 of the second channel 51. The shafts have heads which butt against the plates 61 and 63 at one end and have knobs 71 and 73 at their other end to facilitate their rotation and threaded engagement with the flanges 55 and 57. In the embodiment shown, a second fork consists of resiliently flexible elongated plates 75 and 77 fastened at their front ends to the chassis flanges 21 and 23, preferably by the bolts 64 extending through the laminar arrangement of the prop channel 51, the chassis channel 11, and the respective plates 61 and 75 or 63 and 77. The distance from the rear ends of the plates 75 and 77 to the second plane 65 is varied by the use of shafts 81 and 83 threaded through the chassis flanges 21 and 23 and having their heads butted against the plates 75 and 77. Knobs 85 and 87 on the other end of the shafts 81 and 83 facilitate turning of the shafts 81 and 83 in their threaded engagement through the flanges 21 and 23 of the chassis 11. In the embodiment shown, posts 91 and 93 are fixed to and extend perpendicularly from the front axle 25 and are fixed to the outer walls of the prop channel flanges 55 and 57 to give added strength to the dolly.

In operation, the user rolls the dolly into a position suitable for loading of the motorcycle and operates the locking mechanisms 41 on the casters 27, 29, 35 and 37 to prevent rotation of the wheels 43 and thus fix the dolly in place. The motorcycle is then driven or walked onto the chassis 11 by directing the front wheel F up the ramp 43 and onto the chassis web 17 between the chassis flanges 21 and 23. As the front wheel F is driven onto the chassis 11, the weight of the motorcycle pins the rubber ramp 45 against the ground so as to further lock the dolly into place. As the front wheel F is directed between the flanges 55 and 57 of the prop channel 51, the rear wheel R of the motorcycle will also travel up the ramp 45 and onto the chassis web 17 between the chassis flanges 21 and 23. In this position, the motorcycle is maintained in an upright position and symmetrically aligned on the second plane 65. As the motorcycle continues to move forward until the front wheel F comes into contact with or close to the prop channel web 53, the front wheel F is disposed between the vertical flexible plates 61 and 63 and the horizontal flexible plates 75 and 77. With the motorcycle in this position, the user then rotates the shafts 67, 69, 81 and 83 in their threaded engagements with the channel flanges 21, 23, 55 and 57. This deflects the plates 61, 63, 75 and 77 toward the second plane 65, closing the distance between the plates and clamping the front wheel F of the motorcycle in its vertical condition. The locking mechanisms 41 on the casters 27, 29, 35 and 37 are then released so that the dolly with the vertically held motorcycle can be maneuvered into any desired position. The casters 27, 29, 35 and 37 are preferably capable of 360° turns so that the dolly can be maneuvered linearly or angularly in any direction while the motorcycle remains in its vertical alignment. If the rear wheel R of the motorcycle is positioned approximately midpoint between the rear quarter point 33 and the end 15 of the chassis 11, the stability and turning radius of the dolly are quite satisfactory.

A satisfactory prototype of the device has been made using 10 gauge steel channels, 10 gauge steel plates, 1" solid rubber for the ramp, ½"×3½" shafts for the clamping mechanism and 2½" casters. The above components can be assembled by use of screws, bolts and nuts, welding or any other suitable names. Materials other than steel may be employed including plastics, metals and woods, depending on the structural requirements dictated by the anticipated load on the dolly.

Thus, it is apparent that there has been provided, in accordance with the invention, a motorcycle dolly that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A dolly for a motorcycle comprising:
   unitary carriage means having a plurality of casters for conveying the motorcycle along a first plane; and
   propping means mounted on said carriage means for supporting the motorcycle on said carriage means with the motorcycle symmetrically oriented in relation to a second plane perpendicular to said first plane.

2. A dolly according to claim 1, each of said casters having 360 degree-turn capability.

3. A dolly according to claim 2, each of said casters having locking means thereon for preventing rotation of its wheel.

4. A dolly according to claim 2, said plurality of casters comprising a first pair of casters symmetrically displaced from said second plane on a first axle at a front end of said carriage means and a second pair of casters symmetrically displaced from said second plane on a second axle proximate a rear end of said carriage means.

5. A dolly according to claim 4, said second axle being located at approximately a rear quarter point of said carriage means.

6. A dolly according to claim 1, said carriage means having an elongated rigid frame.

7. A dolly according to claim 6, said frame being a channel having a web parallel to said first plane and flanges extending upwardly therefrom for receiving wheels of the motorcycle therebetween.

8. A dolly according to claim 7, further comprising a ramp having an upper surface sloping from an end of said web toward said first plane.

9. A dolly according to claim 1, said propping means comprising a vertical fork having tines spaced to receive a front wheel of the motorcycle therebetween.

10. A dolly according to claim 9, said tines comprising a pair of plates parallel to said second plane.

11. A dolly according to claim 10 further comprising means for varying a distance between said pair of plates.

12. A dolly according to claim 11, said distance varying means being cooperable with said pair of plates to clamp the front wheel of the motorcycle therebetween.

13. A dolly according to claim 1, said propping means comprising:
   a channel fixed to said carriage means with a web of said channel perpendicular to said first and second planes and flanges of said channel aligned for receiving the front wheel of the motorcycle therebetween;
   at least one pair of resiliently flexible vertical elongated plates, one fixed to an inside wall of each of said flanges proximate one end of said plate; and at least one pair of flexing means, one mounted on each of said flanges and engagable with one of said plates, each said flexing means being cooperable with its associated flange to vary a distance between another end of said plate and said flange.

14. A dolly according to claim 13 having two said pairs of elongated plates and two said pairs of flexing means, one said pair of elongated plates extending in a direction parallel to said first plane and another said pair of elongated plates extending in a direction perpendicular to said first plane.

15. A dolly according to claim 14, each of said flexing means comprising a shaft threadedly engaged through its respective flange and having a head at one end thereof butted against its respective elongated plate.

16. A dolly according to claim 15, each said shaft having a knob at another end thereof to facilitate manual rotation of said shaft in its threaded engagement.

17. A dolly for a motorcycle comprising:
  a first channel having a web oriented in a first plane for supporting the motorcycle with the wheels thereof between flanges of said first channel;
  a second channel fixed to a front end of said first channel having a web oriented in a second plane perpendicular to said first plane for receiving the front wheel of the motorcycle between flanges of said second channel;
  a first pair of casters symmetrically laterally displaced by a first axle from said front end of said first channel and a second pair of casters symmetrically laterally displaced by a second axle from said first channel at approximately a rear quarter point of said first channel, said casters for conveying the dolly along a plane parallel to said first plane;
  a first pair of resiliently flexible elongated plates, one fixed to each of said first channel flanges proximate said front end thereof and oriented parallel to and between said second channel flanges and extending perpendicular to said first channel;
  a second pair of resiliently flexible elongated plates, one fixed to each of said first channel flanges proximate said front end thereof and oriented parallel to and between said first channel flanges and extending perpendicular to said second channel;
  a first pair of flexing means, one mounted on each of said second channel flanges and engagable against its corresponding one of said first pair of plates, each said flexing means being cooperable with its associated flange for varying a distance between another end of said plate and said associated flange; and
  a second pair of flexing means, one mounted on each of said first channel flanges and engagable against its corresponding one of said second pair of plates, each said flexing means being cooperable with its associated flange for varying a distance between another end of said plate and said associated flange.

18. A dolly according to claim 17, each of said casters having 360 degree-turn capability and having locking means thereon for preventing rotation of its wheel.

19. A dolly according to claim 17 further comprising a ramp having an upper surface sloping rearwardly and downwardly from a rear end of said first channel web.

20. A dolly according to claim 17, each of said flexing means comprising a shaft threadedly engaged through its respective flange and having a head at one end thereof butted against its respective elongated plate, each said shaft having a knob at another end thereof to facilitate manual rotation of said shaft in its threaded engagement.

* * * * *